US008971012B2

(12) United States Patent
Jin et al.

(10) Patent No.: US 8,971,012 B2
(45) Date of Patent: Mar. 3, 2015

(54) VARIABLE-AREA CAPACITOR STRUCTURE, COMB GRID CAPACITOR ACCELEROMETER AND COMB GRID CAPACITOR GYROSCOPE

(75) Inventors: Zhonghe Jin, Hangzhou (CN); Shichang Hu, Hangzhou (CN); Xia Zhang, Hangzhou (CN); Huijie Zhu, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 106 days.

(21) Appl. No.: 13/576,042

(22) PCT Filed: Jun. 23, 2010

(86) PCT No.: PCT/CN2010/074340
§ 371 (c)(1),
(2), (4) Date: Jul. 30, 2012

(87) PCT Pub. No.: WO2011/130941
PCT Pub. Date: Oct. 27, 2011

(65) Prior Publication Data
US 2012/0293907 A1 Nov. 22, 2012

(30) Foreign Application Priority Data

Apr. 20, 2010 (CN) .......................... 2010 1 0151630
Apr. 20, 2010 (CN) .......................... 2010 1 0151636
Apr. 20, 2010 (CN) .......................... 2010 1 0151653

(51) Int. Cl.
*H01G 5/04* (2006.01)
*G01C 19/5755* (2012.01)
*G01P 15/125* (2006.01)
*G01P 15/08* (2006.01)

(52) U.S. Cl.
CPC .......... *G01C 19/5755* (2013.01); *G01P 15/125* (2013.01); *G01P 2015/0814* (2013.01)

USPC ........................................... 361/280; 361/277

(58) Field of Classification Search
CPC .. G01N 27/223; G01N 27/226; G01D 5/2412; G01P 15/125
USPC .................. 361/280, 277, 290, 292
See application file for complete search history.

(56) References Cited

U.S. PATENT DOCUMENTS

| 5,488,864 A | 2/1996 | Stephan | |
|---|---|---|---|
| 2004/0221650 A1* | 11/2004 | Lehtonen | 73/514.32 |
| 2008/0190204 A1* | 8/2008 | Danel et al. | 73/514.32 |
| 2009/0147436 A1* | 6/2009 | Wenk | 361/278 |

FOREIGN PATENT DOCUMENTS

| CN | 1748148 A | 3/2006 |
|---|---|---|
| WO | WO2009/120193 A | 10/2009 |

* cited by examiner

*Primary Examiner* — Jenny L Wagner
*Assistant Examiner* — Michael P McFadden
(74) *Attorney, Agent, or Firm* — Jacobson Holman PLLC; Jiwen Chen

(57) ABSTRACT

The present invention relates to a variable-area capacitor for a micromechanical sensor, a micromechanical comb grid capacitor accelerometer and a micromechanical comb grid capacitor gyroscope. Among them, the variable-area capacitor structure comprises of a movable and a fixed electrodes in each capacitor unit; a front surface of aforesaid movable electrode is parallel to that of aforesaid fixed electrode; the front surface of aforesaid movable electrode is in a rectangular shape, and the front surface of the fixed electrode is in a triangular or sawteeth shape or the front surface of the movable electrode is in a triangular or sawteeth shape, and the front surface of the fixed electrode is in a rectangular form; the triangular front surface is only overlapped with one long side of aforesaid rectangular front surface. Micromechanical sensors with variable-area capacitor structures of the invention can adjust elasticity coefficient as compared with present technology.

13 Claims, 12 Drawing Sheets

VARIABLE-AREA CAPACITOR STRUCTURE, COMB GRID CAPACITOR ACCELEROMETER AND COMB GRID CAPACITOR GYROSCOPE

This is a U.S. national stage application of PCT Application No. PCT/CN2010/074340 under 35 U.S.C. 371, filed Jun. 23, 2010 in Chinese, claiming the priority benefits of Chinese Application No. 201010151636.8, filed Apr. 20, 2010, Chinese Application No. 201010151653.1, filed Apr. 20, 2010, and Chinese Application No. 201010151630.0, filed Apr. 20, 2010, which are hereby incorporated by reference.

FIELD OF THE INVENTION

This invention relates to a micromechanical sensor, especially a variable-area capacitor structure available for adjustment of the elasticity coefficient of a micromechanical sensor, a variable-area comb grid capacitor accelerometer with an adjustable elasticity coefficient and variable-area comb grid capacitor gyroscope with electric tuning function.

BACKGROUND OF THE INVENTION

Micromechanical sensors have witnessed rapid development owing to research of several decades. Among micromechanical sensors, the common ones include micromechanical accelerometers and micromechanical gyroscope.

Among others, accelerometer is a device used to measure acceleration imposed on objects. High-precision accelerometers are one of key basic elements as well as an integral part in inertial navigation systems. Accelerometers have many varieties, including liquid floated pendulous ones, flexibility pendulous ones, vibrating string ones, pendulous integrating gyro ones and so on. Micromechanical accelerometers are developed based on micro-electronic industry, which can be integrated on the same chip with sensitive circuits. Owing to such advantage as small volume and low cost, micromechanical accelerometers are widely applied in automobile and consumer electronics fields.

Gyroscopes are sensors used for measurement of angular velocity and displacement, which is a key part of inertial measurement unit. Gyroscopes have witnessed a development course of more than one hundred years since the initial demonstration of self-rotation of the earth with the help of gyroscopic inertia of a high-speed rotating rigid body. Rotary, optical and micromechanical gyroscopes have made their appearance in succession. Coriolis force serves as the sensitive mechanism for vibrating micromechanical gyroscopes. Coriolis force is in direct ratio with rotating speed of objects. The rotating speed of objects can be obtained from measurement of Coriolis force.

The measurement types of micromechanical sensors can be divided into piezoresistive, capacitive, vibration and tunnel types. Among them, capacitive micromechanical sensors have become the mainstream design due to their quick response and simple fabrication.

Specifically, capacitive micromechanical accelerometers can be divided into two types, variable-gap and variable-area capacitor structures. A conventional comb grid capacitor accelerometer has a variable-area capacitor structure. However, because its movable and fixed electrodes are in rectangular forms (according to conventional design), its elasticity coefficient cannot be adjusted.

Micromechanical capacitive gyroscopes also fall into variable-gap and variable-area capacitor structures. Micromechanical gyroscope is associated with frequency difference in driving and sensing directions in terms of such important performance indicators as sensitivity and bandwidth. Reasonable frequency difference should be selected properly in design phase to realize performances as required. It is normally difficult to obtain designed frequency difference during manufacture of micromechanical gyroscopes due to limited manufacturing precision and consistence. Consequently, performance of elements may not be up to the design standard. Normally, it is necessary to proceed with adjustment to resonance frequency, namely electric tuning, in driving or sensing directions so as to improve performance of gyroscopes. It has been applied to gyroscope elements with variable-gap capacitor structures. With regard to existing variable-area capacitor structure, it is unlikely to improve performance of comb grid capacitor gyroscope effectively due to failure to adjust the resonance frequency of comb grid capacitor gyroscope in driving and sensing directions.

DISCLOSURE OF THE INVENTION

Technical Problem

The technical problem to be solved in the present invention is: how to regulate elasticity coefficient of a variable-area capacitor micromechanical sensor, especially elasticity coefficient of a variable-area capacitor accelerometer and resonance frequency of a variable-area capacitor gyroscope.

Technical Solutions

According to the present invention, to realize the regulation of elasticity coefficient of micromechanical devices, the shape of front surface of the unit fixed electrode has been changed from conventional rectangular form to triangular or sawteeth forms while the front surface of the unit movable electrode is parallel to that of unit fixed electrode, and the gap between them remains unchanged; whereas front surface of the unit movable electrode is still in a rectangular form. Alternatively, the front surface of the unit movable electrode can be changed from the conventional rectangular form to triangular or sawteeth shapes while maintaining the rectangular form of the front surface of the unit fixed electrode. Furthermore, the front surface of the unit movable electrode overlaps with that of unit fixed electrode to some extent. An equivalent elasticity coefficient will be available if a direct voltage is imposed between the unit fixed and unit movable electrodes. This equivalent elasticity coefficient can be positive or negative to increase or decrease the total elasticity coefficient. Such capacitor structure can be further applied to variable-area capacitor accelerometer and gyroscope to facilitate regulation of elasticity coefficient of variable-area capacitive accelerometer and resonance frequency of variable-area capacitive gyroscope.

Therefore, an object of the invention is to provide a variable-area capacitor structure available for regulation of elasticity coefficient of micromechanical elements. In the capacitor of each unit, the front surface of the movable electrode is parallel to that of the fixed one; whereas the front surface of the unit movable electrode is in rectangular shape, and that of the unit fixed electrode is in a triangular or hackle shapes. Alternatively, the front surface of the movable electrode is in a triangular or hackle shapes; whereas the front surface of the unit fixed one is in a rectangular shape; wherein said triangular front surface overlaps with one long side of the rectangular front surface.

Further, the saw teeth of the front surface of the sawteeth shape front surface are in triangular shapes; whereas the triangular saw teeth only overlap with one long side of the rectangular front surface.

Further, the saw teeth of the sawteeth shape front surface are in trapezoid shapes, and the trapezoid saw teeth overlap with one long side of the rectangular front surface; whereas the overlapped part is in a triangular shape.

Further, the saw teeth of the sawteeth shape front surface are in trapezoid shapes, and the trapezoid saw teeth overlap with one long side of the rectangular front surface; whereas the overlapped part is in a trapezoid shape. Bottom side of the overlapped part in the trapezoid shape is parallel to the long side of the rectangular front surface.

Another object of the present invention is to apply foregoing variable-area capacitor structure to a conventional comb grid capacitor accelerometer so as to provide a comb grid capacitor accelerometer with an adjustable elasticity coefficient. Variable-area capacitor of electric tuning for regulation of elasticity coefficient is distributed on the accelerometer in its sensitive direction. In each unit capacitor of the variable-area capacitor of electric tuning, the front surface of the movable electrode is parallel to that of the fixed electrode. The front surface of the movable electrode is in a rectangular shape, and the front surface of the fixed electrode is in a triangular shape or sawteeth shape. Alternatively, the front surface of the movable electrode is in a triangular or sawteeth shapes; whereas the front surface of the fixed one is in a rectangular shape; wherein said triangular front surface overlaps with one long side of the rectangular front surface.

Further, the saw teeth of the front surface of the sawteeth shape front surface are in triangular shapes; whereas the triangular saw teeth are only overlapped with one long side of the rectangular front surface.

Further, the saw teeth of the sawteeth shape front surface are in trapezoid shapes, and the trapezoid saw teeth are overlapped with one long side of the rectangular front surface; whereas the overlapped part is in a triangular shape.

Further, the saw teeth of the sawteeth shape front surface are trapezoid shapes, and the trapezoid saw teeth are only overlapped with one long side of the rectangular front surface; whereas the overlapped part is in a trapezoid shape. A bottom side of the overlapped part in a trapezoid shape is parallel to the long side of the rectangular front surface.

Another of object of the present invention is to apply foregoing variable-area capacitor structure to a conventional comb grid capacitor gyroscope to provide a comb grid capacitor gyroscope with adjustable resonance frequencies. Variable-area capacitor of electric tuning is distributed on the gyroscope in its driving or testing direction. In each unit capacitor of the variable-area capacitor of electric tuning, a front surface of the movable electrode is parallel to the front surface of the fixed electrode. The front surface of the movable electrode is in a rectangular shape, and the front surface of the fixed electrode is in a triangular or sawteeth shape. Alternatively, a front surface of the movable electrode is in a rectangular shape, and the front surface of the fixed electrode is in a triangular or sawteeth shape; whereas the front surface of the fixed electrode is in a rectangular shape. The triangular front surface is only overlapped with one long side of the rectangular front surface.

Further, the saw teeth of the front surface of the sawteeth shaped front surface are in triangular shapes; whereas the triangular saw teeth are only overlapped with one long side of the rectangular front surface.

Further, the saw teeth of the sawteeth shapes front surface are in trapezoid shapes, and the trapezoid saw teeth are overlapped with one long side of the rectangular front surface; whereas the overlapped part is in a triangular shape.

Further, the saw teeth of the hackle front surface are in trapezoid shapes, and the trapezoid saw teeth are only overlapped with one long side of the rectangular front surface; whereas the overlapped part is in a trapezoid shape. The bottom side of the overlapped part in trapezoid shape is parallel to the long side of the rectangular front surface.

Beneficial Effect

Variable-area capacitor structures of the present invention have the following advantages as compared with present technology:

1. The introduced equivalent elasticity coefficient can be positive or negative, which is available for flexible design as required;

2. With definite parameter and quantity of capacitor structure, the introduced equivalent elasticity coefficient is constant when the voltage difference between fixed electrode of the unit and movable electrode is fixed;

3. It is possible to adjust the total elasticity coefficient of the micromechanical devices in corresponding direction through regulation of voltage difference between fixed electrode of the unit and the movable electrode.

Comb grid capacitor accelerometer of the present invention with an adjustable elasticity coefficient has the following advantages as compared with present technology:

1. Consistent performance is unlikely to be obtained because discreteness of micromechanical manufacturing technique may result in significant discreteness of elasticity coefficient of comb grid capacitor accelerometer. However, the accelerometer of the present invention can overcome such defect, which can regulate elasticity coefficient of variable-area capacitor of electric tuning through distribution in sensitive direction so as to ensure consistent performance of accelerometers of the same batch;

2. According to MEMS technique, there exists difficulty with the beam of an extremely low elasticity coefficient. The present invention can reduce the elasticity coefficient of devices to obtain better performance by means of electric tuning.

The comb grid capacitor gyroscope of adjustable resonance frequency of the present invention has the following advantages as compared with present technology:

1. The comb grid capacitor gyroscope of the present invention can adjust the resonance frequency in driving or sensing direction through variable-area electric tuning capacitor as distributed in driving or sensing direction so as to ensure consistent performance of gyroscopes of the same batch;

2. The comb grid capacitor gyroscope of the present invention can adjust resonance frequency in driving or sensing direction through variable-area electric tuning capacitor as distributed in driving or sensing direction so as to ensure consistent or equivalent resonance frequency in driving and sensing direction, and improve sensitivity of gyroscope significantly.

Figure 1:
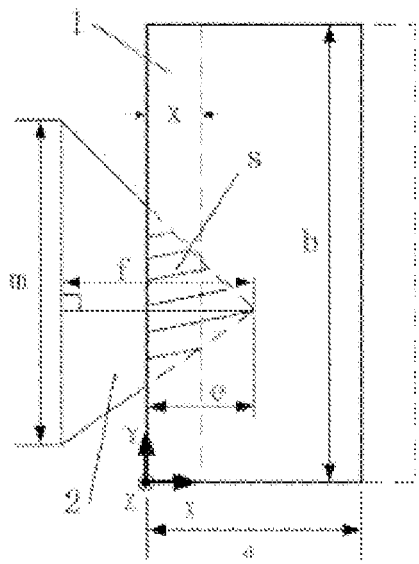
FIG. 1 is a top plan view of the first unilateral variable-area capacitor structure of the present invention when the unit fixed electrode is in a triangular shape.

In the drawings: 1. unit movable electrode; 2. unit fixed electrode; 3. mass block; 4. grate; 5. electric tuning comb; 6. common comb; 7. spring; 8. fixed electrode substrate; 9. extraction electrode; 10. frame; 11. drive mass block; 12. detection mass block; 13. grate; 14. electric tuning electrode; 15. common electrode; 16. drive spring; 17. sense spring; 18. fixed electrode substrate; 19. extraction electrode; 20. frame; a. width of the movable electrode of a rectangular unit; b. length of the movable electrode of a rectangular unit; c. length of the bottom side of a fixed electrode of a right-angled triangular shape; d. height of the fixed electrode of a right-angled triangular shape; h. gap between the unit movable and unit fixed electrodes; e. initial overlapping width between the unit movable and unit fixed electrodes; s. overlapping area between the unit movable and unit fixed electrodes; x. displacement of the unit movable electrode; m. length of the bottom side of the fixed electrode of a triangular shape; f. height of the unit fixed electrode of a triangular shape.

DESCRIPTION OF THE PREFERRED EMBODIMENTS

Referring now to FIG. 1-13, the front surface of the movable electrode 1 of each variable-area capacitor structure of the present invention refers to the surface opposite to the fixed electrode 2; whereas the front surface of the fixed electrode 2 refers to the surface just opposite to the movable electrode 1. The front surface of movable electrode 1 of each unit is parallel to the front surface of the fixed electrode 2.

Figure 9:
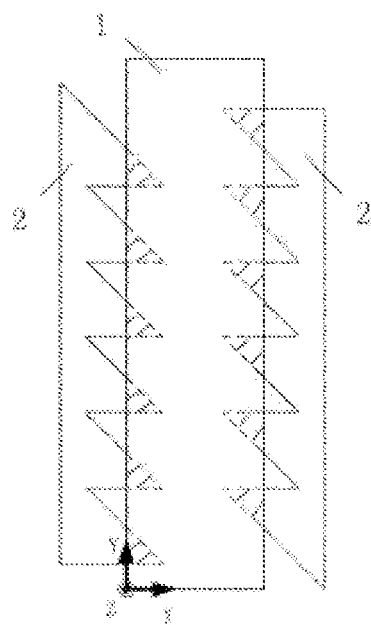
FIG. 9 is a top plan view of the first differential variable-area capacitor structure of the present invention when the unit fixed electrode is in a sawteeth shape and each saw teeth is in a triangular shape.
Figure 10:
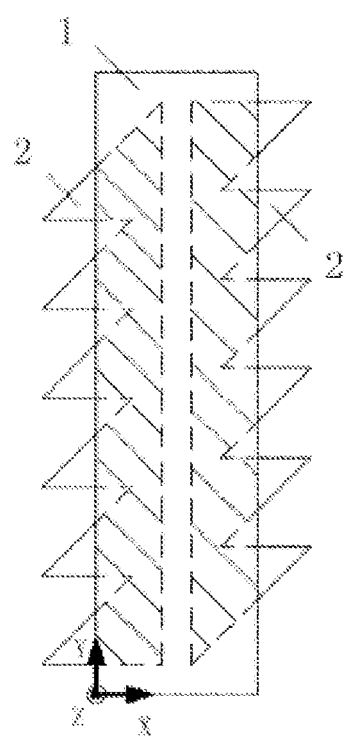
FIG. 10 is a top plan view of the second differential variable-area capacitor structure of the present invention when the unit fixed electrode is in a sawteeth shape and each saw teeth is in a triangular shape.

Referring now to FIG. 1-8, the front surface of the movable electrode 1 of the unit is in a rectangular shape. The triangular front surface of the fixed electrode 2 is only overlapped with one long side of the rectangular front surface of the movable electrode 1 when the front surface of the fixed electrode 2 is in a triangular shape; when the front surface of the fixed electrode 2 is in a sawteeth shape as shown in FIGS. 9 and 10. Each saw tooth will be in a triangular shape, which is only overlapped with one long side of the rectangular front surface of the movable electrode 1 of the unit.

Referring now to FIG. 1, the front surface of the fixed electrode 2 of the unit is only overlapped with on long side of the front surface of the movable electrode 1 to form a triangular overlapped area. Furthermore, one side of the fixed electrode 2 of the triangular unit is parallel to the long side of rectangular movable electrode 1; whereas this side of the fixed electrode 2 of triangular unit is out of the overlapped area. V refers to the voltage difference between the fixed electrode 2 and the movable electrode 1 of the unit; m refers to the length of bottom side of the fixed electrode 2 of the triangular unit; f refers to the height of the fixed electrode 2 of the triangular unit; x refers to displacement of the movable electrode 1 of the unit along X axis. Referring now to FIG. 1, the overlapped part between the movable electrode 1 and the fixed electrode 2 of the unit is in a triangular shape; s refers to the size of the overlapped area; in the event that displacement x to the movable electrode 1 along X axis is produced, the overlapped area between the movable electrode 1 and the fixed electrode 2 of the unit is calculated as follows according to the formula s=bottom side length×height/2 as used for calculation of the triangular area:

$$S = m \cdot (e-x) \cdot (e-x)/2/f$$

Capacitance is calculated as follows with formula for a plate capacitor:

$$C = \xi \cdot S/h = \xi \cdot m \cdot (e-x) \cdot (e-x)/2/h/f$$

Lateral electrostatic force can be obtained by using corresponding formula. In other words, electrostatic force along axis X is calculated as follows:

$$F_x = V^2/2 \cdot dC/dx = V^2/2 \cdot \xi/h \cdot dS/dx$$

Equivalent elasticity coefficient along axis X is finally obtained as follows:

$$k_x = -dF_x/dx = -V^2 \cdot \xi \cdot m/2/h/f$$

Figure 2:
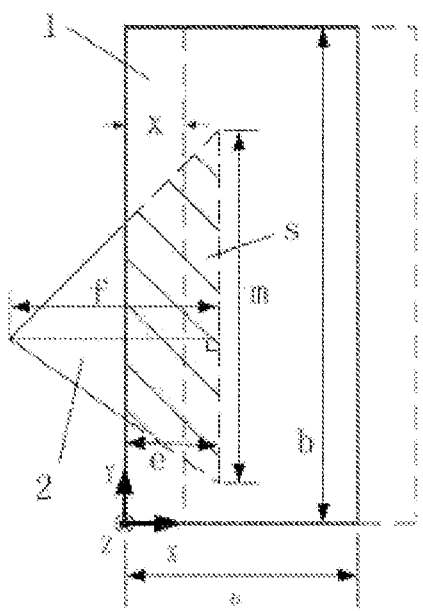
FIG. 2 is a top plan view of the second unilateral variable-area capacitor structure of the present invention when the unit fixed electrode is in a triangular shape.

Referring now to FIG. 2, the front surface of the fixed electrode 2 of the unit is in a triangular shape, which is overlapped with one long side of the rectangular front surface of the movable electrode 1. Furthermore, one side of fixed electrode 2 of the triangular unit is parallel to the long side of rectangular movable electrode 1, which is overlapped with the movable electrode 1 of the rectangular unit. At this point, the overlapped part between the movable electrode 1 and the fixed electrode 2 of the unit is in a trapezoid shape, of which, the area is s. The size of the overlapped area s is calculated as follows with formula for calculation of a trapezoid area: s=(length of upper side+length of bottom side)×height/2:

$$S=\{m+[f-(e-x)]\cdot m/f\}\cdot(e-x)/2$$

Capacitance is calculated as follows with formula for plate capacitor:

$$C=\xi\cdot S/h=\xi\cdot\{m+[f-(e-x)]\cdot m/f\}\cdot(e-x)/2/h$$

Lateral electrostatic force can be obtained by using corresponding formula. In other words, electrostatic force along axis X is calculated as follows:

$$F_x=V^2/2\cdot dC/dx=V^2/2\cdot\xi/h\cdot dS/dx$$

Equivalent elasticity coefficient along axis X is finally obtained as follows:

$$k_x=-dF_x/dx=V^2\cdot\xi\cdot m/2/h/f$$

To facilitate the description of technical proposal of the present invention, it is assumed that width a of the movable electrode 1 of the rectangular unit is 10 μm and the length is 2000 μm, respectively. The length and height of bottom side of fixed electrode 2 of triangular unit is 2000 μm and 10 μm, respectively. The distance h between the movable electrode 1 and fixed electrode 2 of the unit is 1.5 μm, and the voltage difference between fixed electrode 2 and movable electrode 1 is 15V. Referring to FIG. 1, the introduced equivalent elasticity coefficient is −0.1328N/m, which is a negative constant. Referring now to FIG. 2, the introduced elasticity coefficient is 0.1328N/m, which is a positive constant.

Figure 3:
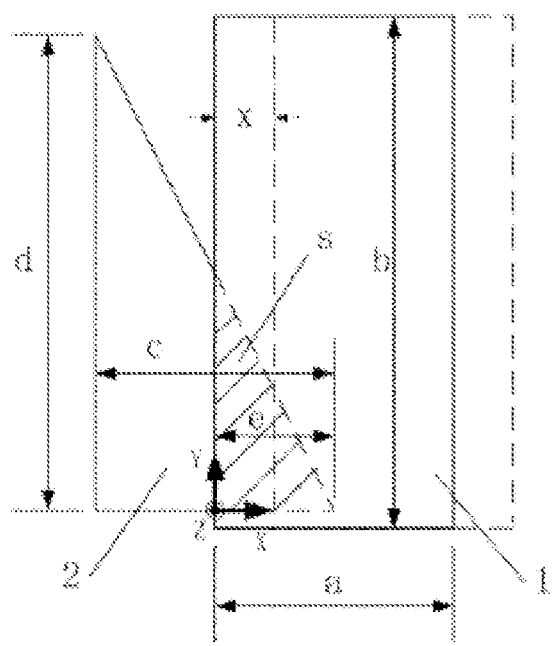
FIG. 3 is a top plan view of the third unilateral variable-area capacitor structure of the present invention when the unit fixed electrode is in a triangular shape.
Figure 13:
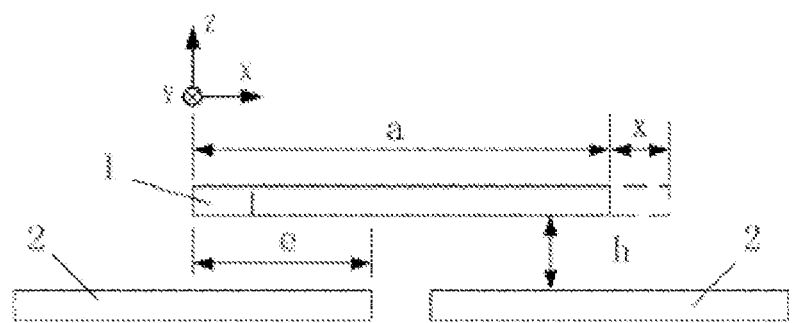
FIG. 13 is a sectional schematic view of the differential variable-area comb grid capacitor capacitor structure of the present invention.

Referring to FIG. 3, the front surface of the fixed electrode 2 of the unit is in a right-angled triangular shape, which is only overlapped with a long side of the rectangular front surface of the movable electrode 1; one right-angled side of the fixed electrode 2 is parallel to a long side of rectangular front surface of the movable electrode 1, of which, the right angle is out of the overlapped area between the movable electrode 1 and fixed electrode 2. V refers to the voltage difference between the fixed electrode 2 and movable electrode 1 of the unit; x refers to displacement of the movable electrode 1 along axis X, which is negative or positive; e, d and c respectively refer to initial overlapping width between the movable electrode 1 and fixed electrode 2 of the unit, height and length of the fixed electrode 2 of right-angled triangular unit. Referring now to FIG. 13, the distance between the movable electrode 1 and fixed electrode 2 of the unit is h, which will remain unchanged when the movable electrode 1 moves along axis X. The overlapped part between the movable electrode 1 and fixed electrode 2 of the unit is in a right-angled triangular shape, of which, the area is s. The length of the bottom side of the right-angled triangular overlapped part is e−x; whereas its height is (e−x)*d/c. The area of overlapped part between the movable electrode 1 and fixed electrode 2 of the unit s is calculated as follows as per formula for calculation of triangular area: s=bottom side length×height/2:

$$S=d\cdot(e-x)\cdot(e-x)/2/c$$

Capacitance is calculated as follows with formula for plate capacitor:

$$C=\xi\cdot S/h=\xi\cdot d\cdot(e-x)\cdot(e-x)/2/h/c$$

Lateral electrostatic force can be obtained by using corresponding formula. In other words, electrostatic force along axis X is calculated as follows:

$$F_x=V^2/2\cdot dC/dx=V^2/2\cdot\xi/h\cdot dS/dx$$

Equivalent elasticity coefficient along axis X is finally obtained as follows:

$$k_x=-dF_x/dx=-V^2\cdot\xi\cdot d/2/h/c$$

Figure 4:
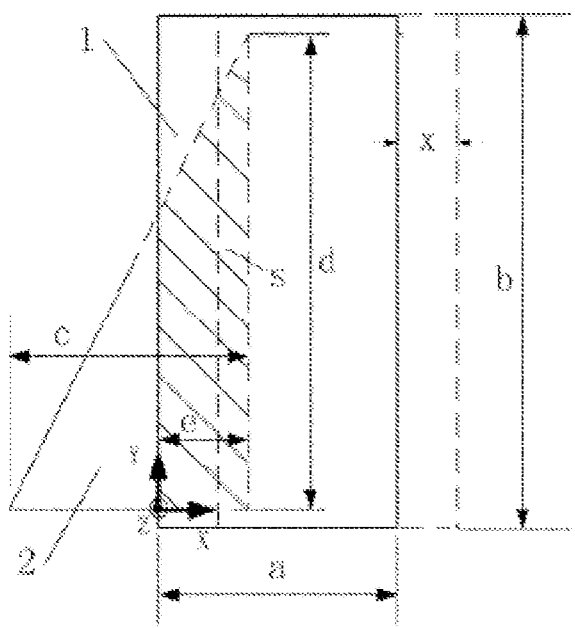
FIG. 4 is a top plan view of the fourth unilateral variable-area capacitor structure of the present invention when the unit fixed electrode is in a triangular shape.

Referring to FIG. 4, the front surface of the fixed electrode 2 of the unit is in a right-angled triangular shape and the front surface is only overlapped with a long side of the rectangular front surface of the movable electrode 1 of the unit; one right-angled side of the fixed electrode 2 of the right-angled triangular unit is parallel to a long side of the rectangular front surface of the movable electrode 1, of which, the right angle is located within the overlapped area between the movable electrode 1 and fixed electrode 2. The overlapped part between the movable electrode 1 and fixed electrode 2 of the unit is in a trapezoid shape, of which, area is s. The upper bottom length of the trapezoid shape is [c−(e−x)]*d/c in the event that displacement x to movable electrode 1 of the unit is produced along axis X.

The length and height of the lower bottom is d and e−x, respectively. The area of the overlapped part between the movable electrode 1 and fixed electrode 2 of the unit is calculated as follows with formula for calculation of trapezoid area: s=(upper bottom length+lower bottom length)×height/2:

$$S=\{d+[c-(e-x)]\cdot d/c\}\cdot(e-x)/2$$

Capacitance is calculated as follows with formula for plate capacitor:

$$C=\xi\cdot S/h=\xi\cdot\{d+[c\cdot(e-x)]\cdot d/c\}\cdot(e-x)/2/h$$

Lateral electrostatic force can be obtained by using corresponding formula. In other words, electrostatic force along axis X is calculated as follows:

$$F_x=V^2/2\cdot dC/dx=V^2/2\cdot\xi/h\cdot dS/dx$$

Equivalent elasticity coefficient along axis X is finally obtained as follows:

$$k_x=-dF_x/dx=V^2\cdot\xi\cdot d/2/h/c$$

To facilitate the description of technical proposal of the present invention, it is assumed that width a and length b of movable electrode 1 of rectangular unit are 10 μm and 2100 μm, respectively. The length c of the bottom side of the fixed electrode 2 of right-angled triangular unit and the height d thereof are 10 μm and 2000 μm, respectively. The distance h between the movable electrode 1 and fixed electrode 2 of the unit is 1.5 μm and voltage difference V between the fixed electrode 2 and movable electrode 1 is 15V. The introduced equivalent elasticity coefficient is −0.1328N/m under the circumstance as shown in FIG. 3. This elasticity coefficient is a negative constant; whereas introduced elasticity coefficient is 0.1328N/m under the circumstance as shown in FIG. 4, which is a positive constant.

Viewing from foregoing embodiments, it is applicable to introduce different elasticity coefficients along axis X to regulate total elasticity coefficient of micromechanical elements along axis X through adjustment of the voltage difference V between the fixed electrode 2 and movable electrode 1 of the unit when certain structure is specified or in other words, capacitor structural parameters and quantity are definite.

Figure 5:
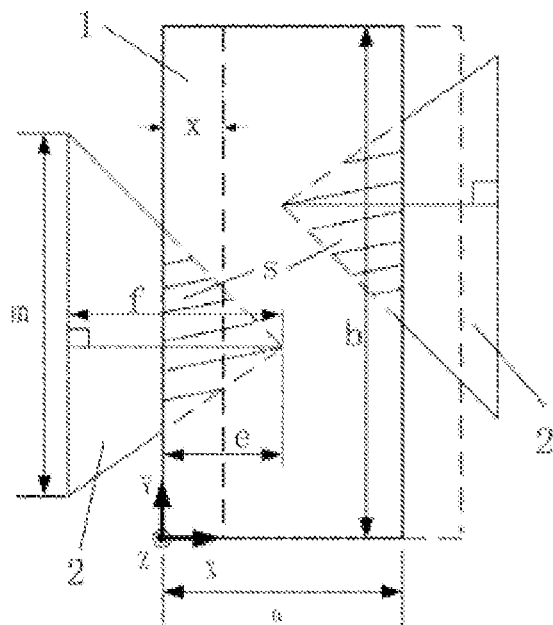
FIG. 5 is a top plan view of the first differential variable-area capacitor structure of the present invention when the unit fixed electrode is in a triangular shape.
Figure 6:
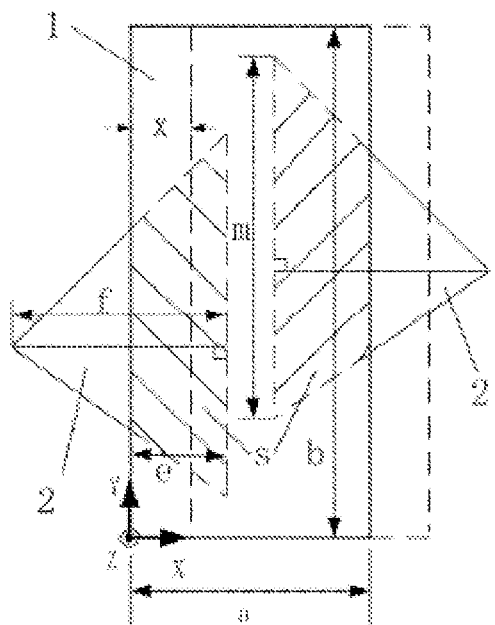
FIG. 6 is a top plan view of the second differential variable-area capacitor structure of the present invention when the unit fixed electrode is in a triangular shape.
Figure 7:
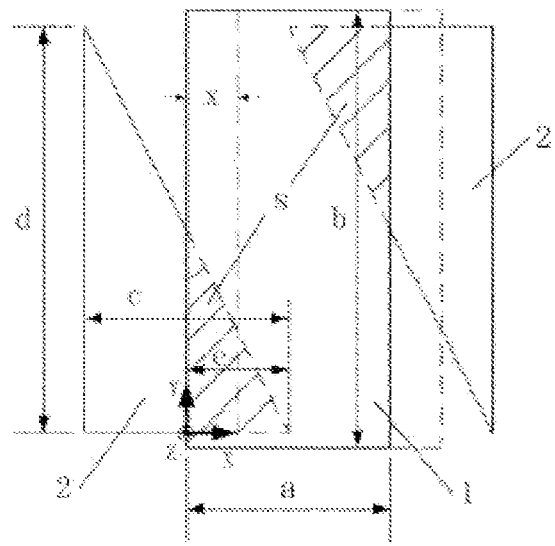
FIG. 7 is a top plan view of the third differential variable-area capacitor structure of the present invention when the unit fixed electrode is in a triangular shape.
Figure 8:
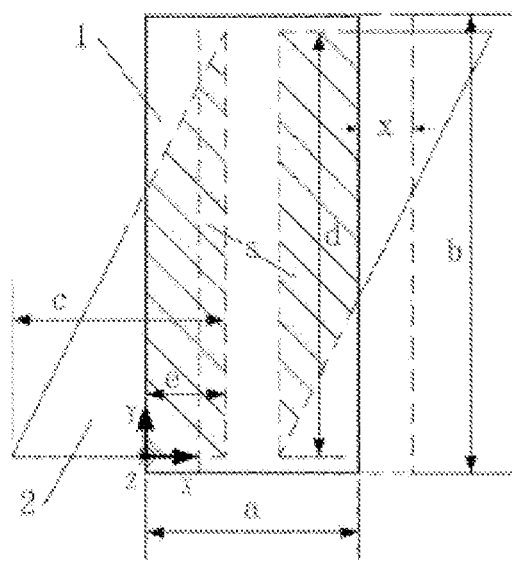
FIG. 8 is a top plan view of the fourth differential variable-area capacitor structure of the present invention when the unit fixed electrode is in a triangular shape.

When the unit capacitor is a differential capacitor as shown in FIGS. 5-8, the method for calculation of the equivalent elasticity coefficient as unilaterally introduced is identical to foregoing method; whereas the elasticity coefficient of the differential capacitor as integrally introduced is twice of the elasticity coefficient as unilaterally input. Wherein, when the voltage difference V between the specified structure, the fixed electrode 2 and movable electrode 1 of the unit is fixed, introduced elasticity coefficient as shown in FIGS. 5 and 7 is a negative constant; whereas introduced equivalent elasticity coefficient as shown in FIGS. 6 and 8 is a positive constant.

If the front surface of fixed electrode 2 of the unit is in a sawteeth shape as shown in FIGS. 9 and 10, each saw tooth is in a triangular shape, and overlapped with one long side of the rectangular front surface of the movable electrode 1. A triangular sawteeth capacitor structure is to be formed by each saw tooth and the rectangular front surface of the movable electrode 1 of the unit. The method for calculation of introduced equivalent elasticity coefficient for each triangular sawteeth capacitor structure is similar to foregoing method; whereas introduced equivalent elasticity coefficient for the whole capacitor structure is the sum of that introduced by all triangular sawteeth capacitor structures of the movable electrode 2 of the unit.

Similarly, it can be inferred with foregoing calculation method that introduced equivalent elasticity coefficient for the whole capacitor with such structure will be negative or positive constant when voltage difference V between the fixed electrode 2 and movable electrode 1, the structure of the unit is fixed in the event that front surface of the movable electrode 1 is in a triangular shape, and the front surface of the fixed electrode 2 is in rectangular form (not shown in figures).

Figure 11:
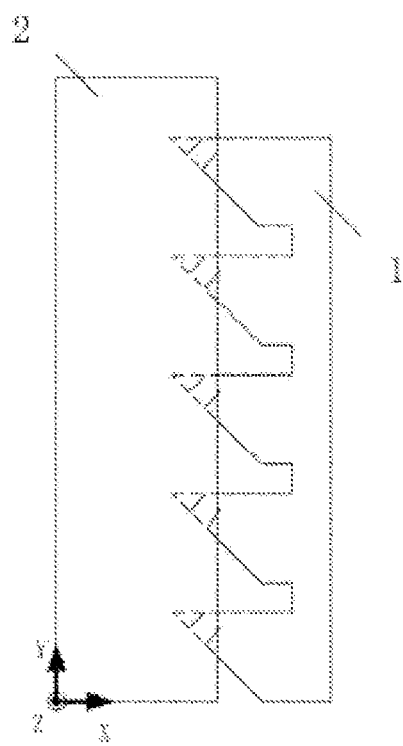
FIG. 11 is a top plan view of the first variable-area capacitor structure of the present invention when the unit movable electrode is in a trapezoid shape and each saw teeth is in a trapezoid shape.
Figure 12:
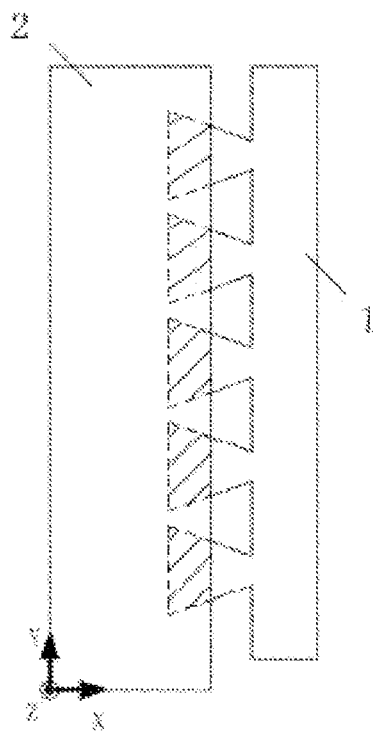
FIG. 12 is a top plan view of variable-area capacitor structure of the present invention when the unit movable electrode is in a trapezoid shape and each saw teeth is in a trapezoid shape.

Referring now to FIGS. 11 and 12, the front surface of the movable electrode 1 of the unit is in a sawteeth shape; whereas each saw tooth is in a trapezoid shape. Meanwhile, the front surface of fixed electrode 2 of the unit is in a rectangular shape as shown in schematic view for variable-area capacitor structure of the present invention.

Referring now to FIG. 11, each saw tooth of sawteeth shape front surface of the movable electrode 1 of the unit is in a trapezoid shape, which is only overlapped with one long side of rectangular front surface of fixed electrode 2 of the unit; overlapped part is in a triangular shape; whereas a triangular capacitor structure is formed by each saw tooth and rectangular front surface of the fixed electrode 2 of the unit. At this point, the method for calculation of introduced equivalent elasticity coefficient for each trapezoid sawteeth capacitor structure is similar to the method for foregoing triangular overlapped part. The equivalent elasticity coefficient for the whole capacitor structure is the sum of that introduced by all triangular capacitor structures, which is negative or positive constant.

Referring now to FIG. 12, each saw tooth of sawteeth front surface of the movable electrode 1 of the unit is in a trapezoid shape, which is only overlapped with one long side of a rectangular front surface of fixed electrode 2 of the unit; whereas the overlapped part is in a trapezoid shape, of which, the bottom side is parallel to the long side of the rectangular front surface. A trapezoid capacitor structure is formed by each saw tooth and rectangular front surface of the fixed electrode 2 of the unit. At this point, the method for calculation of introduced equivalent elasticity coefficient for each trapezoid hackle capacitor structure is similar to that for foregoing trapezoid overlapped part. Introduced equivalent elasticity coefficient for the whole capacitor structure is the sum of that introduced by all trapezoid hackle capacitor structures of the fixed electrode 2 of the unit, which is negative or positive constant.

Similarly, the front surface of fixed electrode 2 of the unit is in a sawteeth shape; whereas each saw tooth is in a trapezoid shape; the equivalent elasticity coefficient as input for variable-area capacitor structure (not shown in figures) of the present invention with the front surface of movable electrode 1 of the unit in a rectangular shape is either negative or positive. Such elasticity coefficient will be a constant when voltage difference V between the specified structure, fixed electrode 2 and movable electrode 1 of the unit is fixed.

Figure 14:
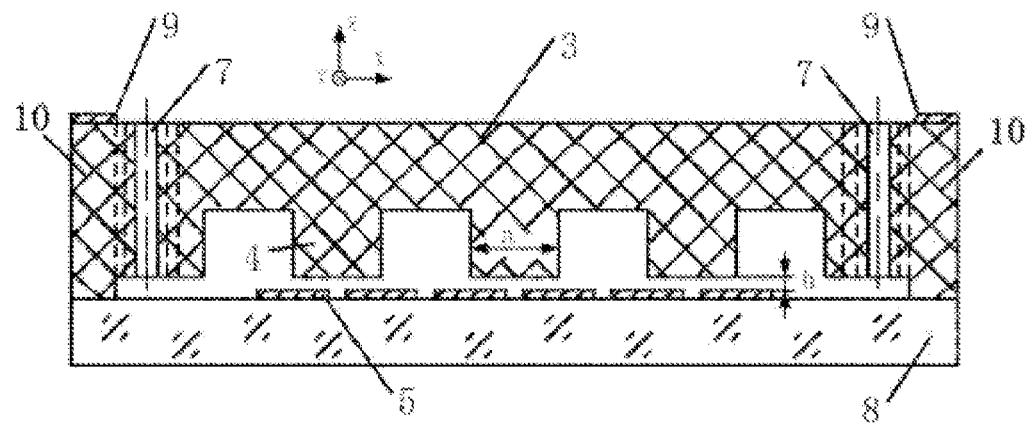
FIG. 14 is a sectional schematic view of the comb grid capacitor accelerometer of the present invention with adjustable elasticity coefficient.
Figure 15:
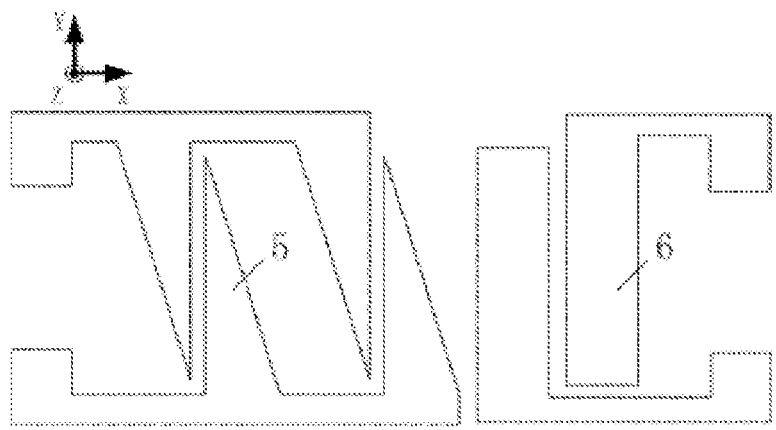
FIG. 15 is a schematic view for the distribution of the fixed electrode of comb grid capacitor accelerometer of the present invention with adjustable elasticity coefficient.
Figure 16:
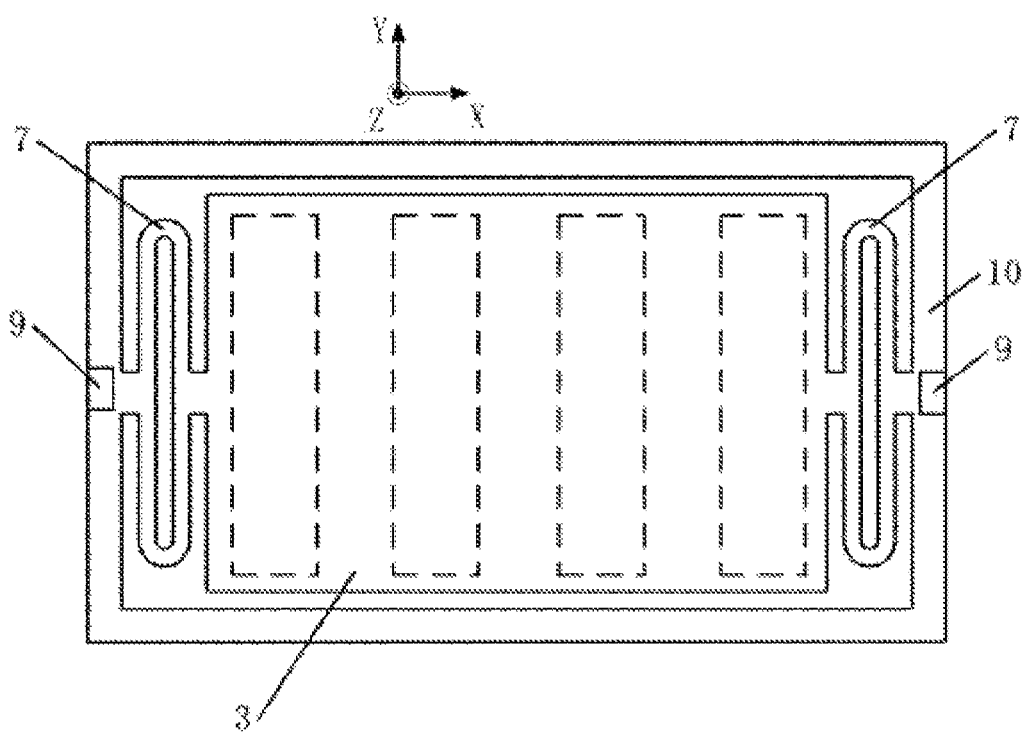
FIG. 16 is a top plan view of the comb grid capacitor accelerometer of the present invention with adjustable elasticity coefficient.

Referring now to FIG. 14-16 for variable-area comb grid capacitor accelerometer of the present invention with elasticity coefficient available for regulation, if the foregoing variable-area capacitor structure is applied to the conventional comb grid capacitor accelerometer, the grate 4 will be the movable electrode 1 of the unit; the electric tuning comb 5 will be the fixed electrode 2 of the unit for the electric tuning capacitor; the common comb 6 will be the fixed electrode 2 of the unit for conventional variable-area capacitor; the front surface of the movable electrode 1 of the unit will be the surface just opposite to the fixed electrode 2; the front surface of the fixed electrode 2 will be the surface just opposite to the movable electrode 1 of the unit. The frame 10 and the electric tuning comb 5 are fixed to the substrate 8 of the fixed electrode; the mass block 3 is connected with the spring 7 in connection with the frame 10; the electric signals on the mass block 3 is input or output via the extraction electrode 9 as shown in FIG. 15. The spring 7 is available as a U-type spring, a straight beam or a folded beam. The sense direction is along X axis. The elasticity coefficient of variable-area comb grid capacitor accelerometer of the present invention in sense direction cane b adjusted by imposing a voltage between the electric tuning comb 5 and the grate 4.

Taking the following illustrations for example, mass m of the mass block in variable-area comb grid capacitor accelerometer is $5.1882 \times 10^{-6}$ kg; whereas elasticity coefficient k is 591.19N/m. As calculated according to the formula for calculation of resonance frequency $f=\frac{1}{2}/\pi \cdot (k/m)^{1/2}$, resonance frequency of accelerometer in sense direction before adjustment of elasticity coefficient is 1.6989 kHz. Once parameter setting for foregoing embodiments is applied, resonance frequency of variable-area comb grid capacitor accelerometer can be increased by 7.6156 Hz if corresponding elasticity coefficient is increased by 5.3120N/m. Similarly, aforesaid resonance frequency can be decreased by 7.6499 Hz, if corresponding elasticity coefficient is decreased by 5.3120N/m. With regard to variable-area comb grid capacitor accelerometer of the present invention, it is applicable to increase or decrease resonance frequency by regulating voltage difference between fixed electrode 2 and movable electrode 1 of the unit. It is even applicable to obtain approximate or zero elasticity coefficient and resonance frequency of variable-area comb grid capacitor accelerometer through design of beam structure with lower elasticity coefficient.

Figure 17:
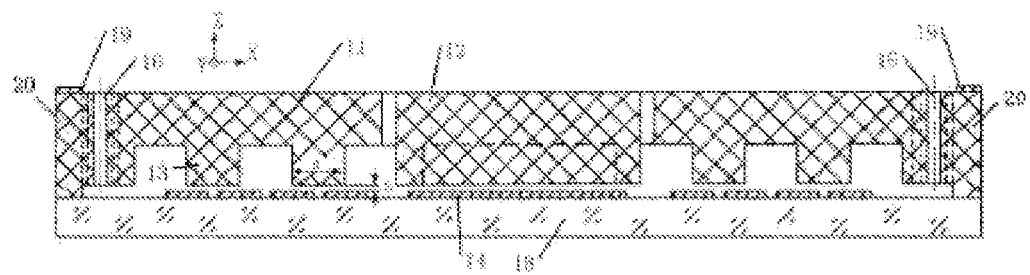
FIG. 17 is a sectional schematic view of comb grid capacitor gyroscope of the present invention with adjustable resonance frequency.
Figure 18:
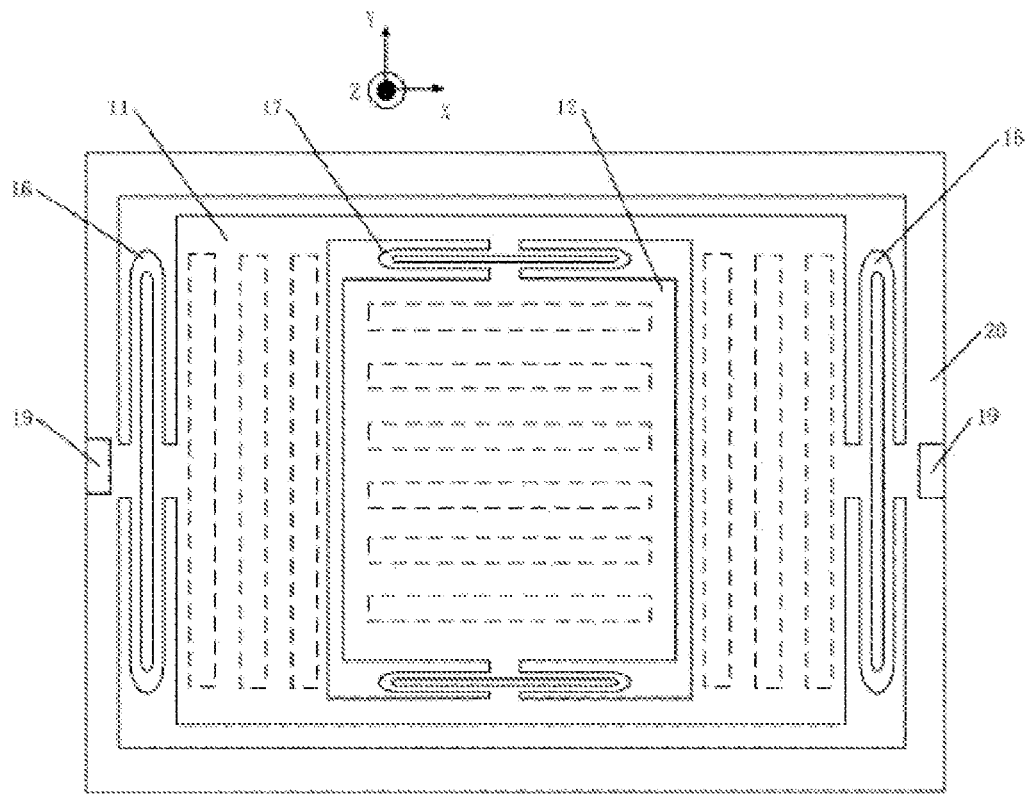
FIG. 18 is a top plan view of comb grid capacitor gyroscope of the present invention with adjustable resonance frequency.

FIG. 17 is the sectional schematic view of variable-area comb grid capacitor gyroscope of the present invention available for electric tuning. Once foregoing variable-area capacitor structure is applied to a conventional comb grid capacitor gyroscope, the grate 13 will be a movable electrode 1 of the unit; the electric tuning comb 14 will be a fixed electrode 2 of the unit for an electric tuning capacitor; the common comb 15 will be a fixed electrode 2 of unit for a conventional variable-area capacitor. The frame 20 is fixed to the substrate 18 of a fixed electrode; an electric tuning comb 14 and common comb 15 are fixed to the substrate 18 of the fixed electrode; the drive mass 11 is connected with the frame 20 via a drive spring 16; the sense mass 12 is connected with the drive mass 11 via a sense spring 17 to constitute an integral part of the drive mass 11; electric signals are input or output via an extraction electrode 19 as shown in FIG. 18. The drive spring 16 and sense spring 17 can be in the form of U beam, straight beam or folded beam; whereas the gyroscope drive direction and sense direction are also relative to each other, which are to be defined through design.

Figure 19:
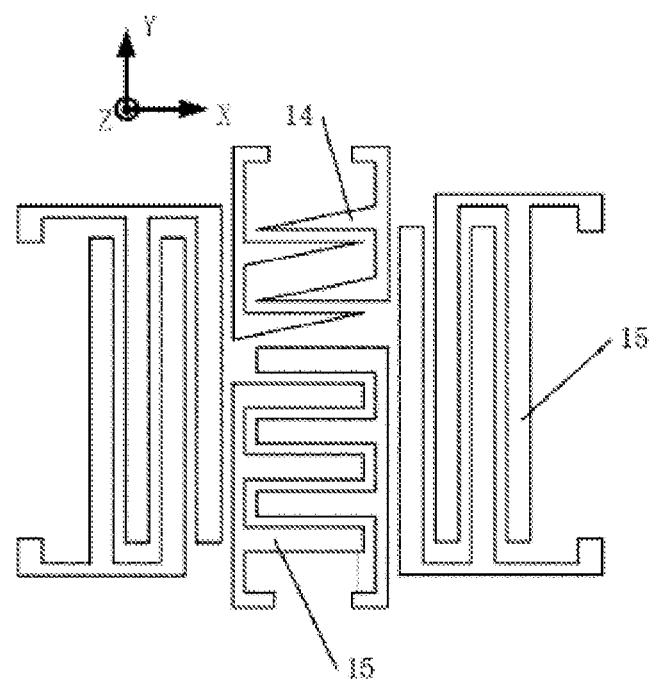
FIG. 19 is a schematic view for the distribution of the fixed electrode of comb grid capacitor gyroscope of the present invention with adjustable resonance frequency.

Referring now to FIGS. 17-19, the drive and sense directions are along X and Y axis, respectively; the drive mass 11 is available to oscillate along X axis; whereas the sense mass 12 is available to oscillate along both X and Y axes. The drive mass 11 and sense mass 12 resonate along X axis. The input of a fixed angular velocity will cause vibration of sense mass 12 along Y axis under the same frequency. More close resonance frequency of the drive and sense modes will cause vibration of a larger amplitude of the sense mass 12 along Y axis and bring higher sensitivity. It is difficult to improve the performance of conventional comb grid capacitor gyroscope because the inability to adjust the elasticity coefficient of the drive or sense modes. As a certain quantity of electric tuning variable-area capacitors for comb grid capacitor gyroscope of the present invention are distributed along the drive or sense direction, it is applicable to adjust elasticity coefficient in the drive or sense direction as required to further adjust the resonance frequency in the corresponding direction.

Taking the following illustrations for instance, proof mass 12 and drive mass 11 of comb grid capacitor gyroscope is $5.1882 \times 10^{-6}$ kg and $1.0227 \times 10^{-5}$ kg, respectively; whereas elasticity coefficient in sense and sense directions is 591.19N/m and 1145N/m, respectively. Therefore, resonance frequency of sense and drive modes before electric tuning is 16 99 Hz and 1684 Hz, respectively. It is applicable to adjust resonance frequency in sense mode to that in drive mode by introducing an elasticity coefficient of −10.36N/m in sense direction through foregoing capacitor structure. Alternatively, it is also applicable to adjust resonance frequency in drive mode to that in sense mode by introducing a elasticity coefficient of 20.5N/m in driving direction. It is also applicable to introduce certain elasticity coefficient in both drive and sense directions to ensure the same resonance frequency in both directions and effective sensitivity improvement of the gyroscope.

In conclusion, it is possible to regulate elasticity coefficient in drive or sense direction by regulating the voltage difference between fixed electrode 2 and movable electrode 1 of the unit for an electric tuning variable-area capacitor of comb grid capacitor gyroscope in the corresponding direction. This method aims to further regulate resonance frequency of drive and sense mode, which is simple and convenient.

The invention claimed is:

1. A variable-area capacitor structure, comprising a movable electrode and a fixed electrode in each capacitor unit, wherein a front surface of the movable electrode is parallel to a front surface of the fixed electrode, characterized in that: the front surface of the movable electrode is in a rectangular shape, and the front surface of the fixed electrode is in a triangular shape or a sawteeth shape; or the front surface of the movable electrode is a triangular shape or a sawteeth shape, and the front surface of the fixed electrode is in a rectangular shape; the triangular front surface is only overlapped with one long side of the rectangular front surface; vertical distance between the movable electrode and the fixed electrode remains unchanged, and comparative movement between the movable electrode and the fixed electrode is parallel movement; wherein the movable electrode moves parallelly along a vertical direction of the one long side of the rectangular front surface that is overlapped with the triangular front surface; wherein a voltage is imposed between the movable electrode and the fixed electrode, so that an equivalent elasticity coefficient is produced and the equivalent elasticity coefficient is adjusted by adjusting the voltage imposed; and wherein the equivalent elasticity coefficient of the capacitor structure is constant when the voltage difference between fixed electrode of the unit and movable electrode is fixed and structure parameter and quantity of the capacitor structure are predetermined.

2. The variable-area capacitor structure according to claim 1, which is characterized in that each saw tooth of the sawteeth shape front surface is in a triangular shape, and is only overlapped with one long side of the rectangular front surface.

3. The variable-area capacitor structure according to claim 1, which is characterized in that each saw tooth of the sawteeth shape is in a trapezoid shape, and is only overlapped with one long side of the rectangular front surface; whereas overlapped part is in a triangular form.

4. The variable-area capacitor structure according to claim 1, which is characterized in that each saw tooth of the sawteeth shape front surface is in a trapezoid form, and is only overlapped with one long side of the rectangular front surface; whereas overlapped part is in a trapezoid shape, a bottom side of the trapezoid shape is parallel to a long side of the rectangular front surface.

5. A comb grid capacitor accelerometer with adjustable elasticity coefficient, which is characterized in that: an electric tuning variable-area capacitor for regulation of elasticity coefficient is distributed in a sensitive direction of the accelerometer; in each unit capacitor of the electric tuning variable-area capacitor, the front surface of the movable electrode is parallel to the front surface of the fixed electrode; the front surface of the movable electrode is in a rectangular shape, and the front surface of the fixed electrode is in a triangular shape or a sawteeth shape or the front surface of the movable electrode is in a triangular shape or sawteeth shape, and the front surface of the fixed electrode is in a rectangular shape; the triangular front surface is only overlapped with one long side of the rectangular front surface; vertical distance between the movable electrode and the fixed electrode remains unchanged, and comparative movement between the movable electrode and the fixed electrode is parallel movement; wherein the movable electrode moves parallelly along a vertical direction of the one long side of the rectangular front surface that is overlapped with the triangular front surface; wherein a voltage is imposed between the movable electrode and the fixed electrode, so that an equivalent elasticity coefficient is produced and the equivalent elasticity coefficient is adjusted by adjusting the voltage imposed; and wherein the equivalent elasticity coefficient of the capacitor structure is constant when the voltage difference between fixed electrode of the unit and movable electrode is fixed and structure parameter and quantity of the capacitor structure are predetermined.

6. The comb grid capacitor accelerometer with adjustable elasticity coefficient according to claim 5, characterized in that each saw tooth of the sawteeth shape front surface is in a triangular form, and is overlapped with one long side of the rectangular front surface.

7. The comb grid capacitor accelerometer with elasticity coefficient available for regulation according to claim 5, which is characterized in that each saw tooth of the sawteeth shape front surface is in a trapezoid shape, and is only overlapped with one long side of the rectangular front surface; the overlapped part is in a triangular shape.

8. The comb grid capacitor accelerometer with adjustable elasticity coefficient available for regulation according to claim 5, which is characterized in that each saw tooth of the sawteeth shape front surface is in a trapezoid shape, and is only overlapped with one long side of the rectangular front surface; the overlapped part is in a trapezoid shape, a bottom side of the trapezoid shape is parallel to a long side of the rectangular front surface.

9. A comb grid capacitor gyroscope with adjustable resonance frequency, which is characterized in that an electric tuning variable-area capacitor is distributed in a drive direction or a sense direction of the gyroscope; a front surface of a movable electrode in each unit capacitor of the electric tuning variable-area capacitors is parallel to a front surface of a fixed electrode of the unit capacitor, which is characterized in that the front surface of the movable electrode is in a rectangular shape, and the front surface of the fixed electrode is in a triangular shape or a sawteeth shape or the front surface of the movable electrode is in a triangular shape or a sawteeth shape, and the front surface of the fixed electrode is in a rectangular form; the triangular front surface is only overlapped with one long side of the rectangular front surface; vertical distance between the movable electrode and the fixed electrode remains unchanged, and comparative movement between the movable electrode and the fixed electrode is parallel movement; wherein the movable electrode moves parallelly along a vertical direction of the one long side of the rectangular front surface that is overlapped with the triangular front surface; wherein a voltage is imposed between the movable electrode and the fixed electrode, so that an equivalent elasticity coefficient is produced and the equivalent elasticity coefficient is adjusted by adjusting the voltage imposed; and wherein the equivalent elasticity coefficient of the capacitor structure is constant when the voltage difference between fixed electrode of the unit and movable electrode is fixed and structure parameter and quantity of the capacitor structure are predetermined.

10. The comb grid capacitor gyroscope with adjustable resonance frequency according to claim 9, which is characterized in that each saw tooth of the sawteeth shape front surface is in a triangular shape, and is only overlapped with one long side of the rectangular front surface.

11. The comb grid capacitor gyroscope with adjustable resonance frequency according to claim 9, which is characterized in that each saw tooth of the sawteeth shape front surface is in a trapezoid shape, and is only overlapped with one long side of the rectangular front surface; the overlapped part is in a triangular shape.

12. The comb grid capacitor gyroscope with adjustable resonance frequency according to claim 9, which is characterized in that saw tooth of the sawteeth shape front surface is in a trapezoid shape, and is only overlapped with one long side of the rectangular front surface; the overlapped part is in a trapezoid shape, a bottom side of the trapezoid shape is parallel to the rectangular front surface.

13. The variable-area capacitor structure according to claim 1, wherein the equivalent elasticity coefficient along axis X is as follows:

$$k_x = -dF_x/dx = -V^2 \cdot \xi \cdot m/2/h/f,$$

wherein S (overlapped area)$= m \cdot (e-x) \cdot (e-x)/2/f$;
C (capacity)$= \xi \cdot S/h = \xi \cdot m \cdot (e-x) \cdot (e-x)/2/h/f$;
$F_x$ (electrostatic force along axis X)$= V^2/2 \cdot dC/dx = V^2/2 \cdot \xi/h \cdot dS/dx$; and wherein V refers to the voltage difference between the fixed electrode and the movable electrode; m refers to the length of bottom side of the fixed electrode of the triangular unit; f refers to the height of the fixed electrode of the triangular unit; x refers to displacement of the movable electrode of the unit along X axis.

* * * * *